(12) United States Patent
Solis et al.

(10) Patent No.: US 10,044,771 B2
(45) Date of Patent: *Aug. 7, 2018

(54) APPARATUS, METHOD, AND COMPUTER PROGRAM FOR STREAMING MEDIA PERIPHERAL ADDRESS AND CAPABILITY CONFIGURATION

(71) Applicant: AMX LLC, Richardson, TX (US)

(72) Inventors: Juan Antonio Solis, Dallas, TX (US); Alex Pogostin, Richardson, TX (US); Jason Talley, Garland, TX (US)

(73) Assignee: AMX LLC, Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/457,139

(22) Filed: Mar. 13, 2017

(65) Prior Publication Data

US 2017/0187759 A1 Jun. 29, 2017

Related U.S. Application Data

(63) Continuation of application No. 13/483,574, filed on May 30, 2012, now Pat. No. 9,635,064.

(60) Provisional application No. 61/491,519, filed on May 31, 2011.

(51) Int. Cl.
| | |
|---|---|
| *G06F 15/16* | (2006.01) |
| *H04L 29/06* | (2006.01) |
| *H04L 5/00* | (2006.01) |
| *H04L 29/12* | (2006.01) |
| *H04L 12/28* | (2006.01) |

(52) U.S. Cl.
CPC ........ *H04L 65/1069* (2013.01); *H04L 5/0055* (2013.01); *H04L 12/2859* (2013.01); *H04L 61/2015* (2013.01); *H04L 61/6022* (2013.01)

(58) Field of Classification Search
None
See application file for complete search history.

(56) References Cited

U.S. PATENT DOCUMENTS

| | | | |
|---|---|---|---|
| 6,876,667 B1 * | 4/2005 | Synnestvedt | H04L 12/2801 370/352 |
| 2006/0153122 A1 * | 7/2006 | Hinman | H04L 63/10 370/328 |
| 2008/0092213 A1 * | 4/2008 | Wei | H04L 61/2015 726/4 |
| 2008/0109559 A1 * | 5/2008 | Chhabra | H04L 12/2856 709/238 |
| 2009/0307338 A1 * | 12/2009 | Arberg | H04L 29/12273 709/221 |
| 2010/0165980 A1 * | 7/2010 | Sargor | H04L 12/2889 370/352 |
| 2010/0191813 A1 * | 7/2010 | Gandhewar | H04L 61/2015 709/206 |

OTHER PUBLICATIONS

M. Patrick, DHCP Relay Agent Information Option, Jan. 2001, 14 pages.*

* cited by examiner

*Primary Examiner* — Joshua Joo

(57) ABSTRACT

A network-enabled device may include an interface operably connected to an interface of a streaming media device, and be configured to receive a request from the streaming media device. The network-enabled device may also include a processor configured to allow the request from the streaming media device based on a vendor matching policy.

20 Claims, 4 Drawing Sheets

APPARATUS, METHOD, AND COMPUTER PROGRAM FOR STREAMING MEDIA PERIPHERAL ADDRESS AND CAPABILITY CONFIGURATION

CROSS-REFERENCE TO RELATED APPLICATION

This application is a continuation of U.S. patent application Ser. No. 13/483,574, filed on May 30, 2012, entitled "APPARATUS, METHOD, AND COMPUTER PROGRAM FOR STREAMING MEDIA PERIPHERAL ADDRESS AND CAPABILITY CONFIGURATION,", which claims the benefit of U.S. Provisional Patent Application No. 61/491,519, filed on May 31, 2011, the entire contents of which are incorporated by reference herein.

FIELD

The present disclosure pertains to addressing and configuring media peripherals, and more particularly, to providing addressing information to, and configuring of, streaming media peripherals.

BACKGROUND

Currently, special communication protocols and separate connections between the streaming peripheral and the display device are required to configure the streaming peripheral. However, configuring capabilities requested of the streaming peripheral by network-enabled display devices without using special connectors may be beneficial. It may also be beneficial to restrict which streaming peripheral devices can communicate with network-enabled display devices.

SUMMARY

Certain embodiments of the present invention may provide solutions to the problems and needs in the art that have not yet been fully identified, appreciated, or solved by current streaming peripheral configuration systems. For example, in some embodiments, addressing information may be provided to streaming media peripherals, and the capabilities being requested of the streaming media peripherals may be configured by network-enabled display devices, such as a display or panel, without using special connectors. In certain embodiments, streaming media peripherals devices may be restricted as to which network-enabled display devices the streaming media peripherals devices may communicate with. Such embodiments maximize the use of open protocols to convey information and do not require a special cable or connection. These embodiments also allow the network-enabled display device to determine if the network-enabled display device's capability configuration should be sent to the streaming media peripheral.

In one embodiment, a network-enabled device may include an interface operably connected to an interface of a streaming media device, and be configured to receive a request from the streaming media device. The network-enabled device may also include a processor configured to allow the request from the streaming media device based on a vendor matching policy.

In another embodiment, a computer-implemented method may include receiving, at a network-enabled device, a request message from a streaming media device. The method may further include transmitting, at the network-enabled device, an acknowledgement message based on a vendor matching policy.

In yet another embodiment, a computer program may be embodied on a non-transitory computer-readable medium. The computer program may be configured to cause a processor to receive a request message from a streaming media device, and transmit an acknowledgement message based on a vendor matching policy.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

One or more embodiments pertain to providing addressing information to streaming media peripherals, and configuring the capabilities being requested of the streaming media peripherals by, for example, network-enabled display devices, without using special connectors.

Figure 1:
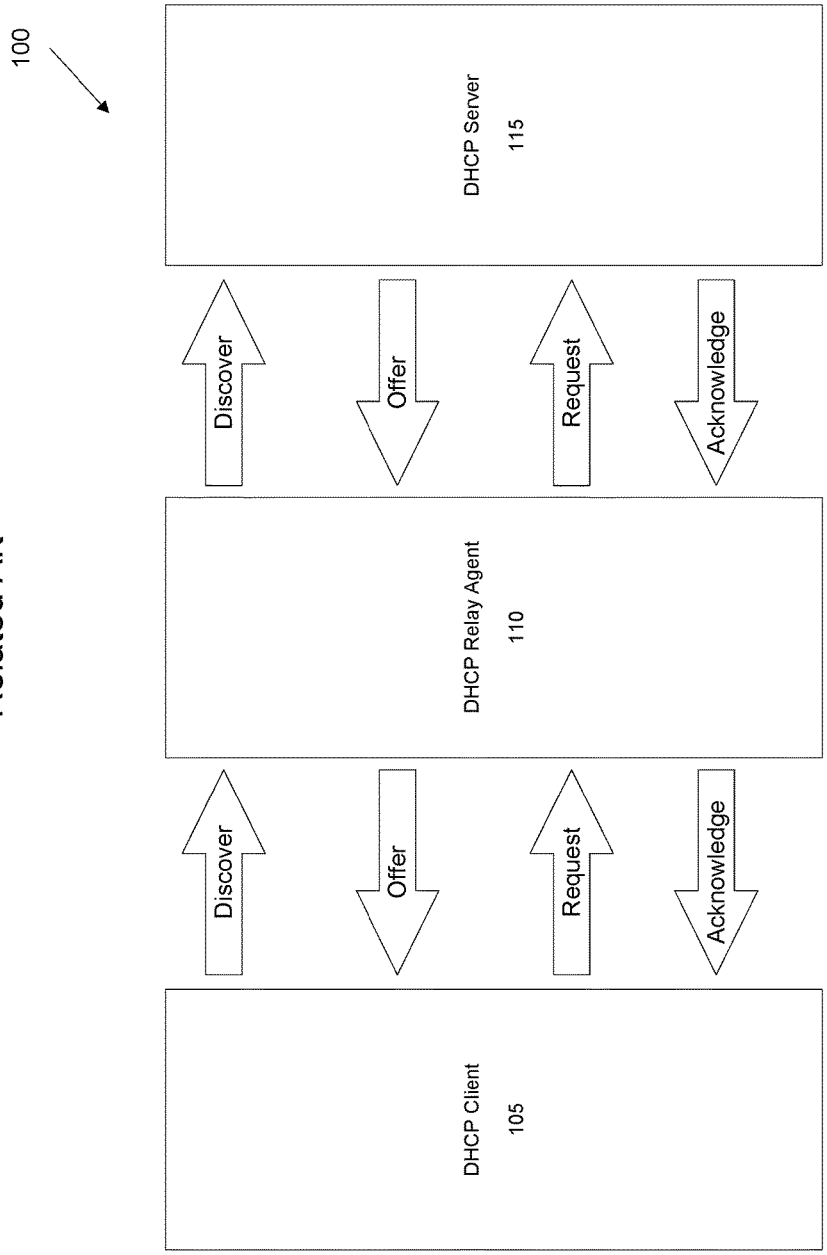
FIG. 1 illustrates a block diagram of a system for assigning an Internet Protocol (IP) address.

FIG. 1 illustrates a flow diagram of a system 100 for assigning an IP address. For instance, system 100 uses a dynamic host configuration protocol (DHCP) relay related packets to allow a DHCP server 115 to assign IP addresses using network topology information.

In a conventional DHCP relay assisted address negotiation, a DHCP client 105 issues a discover message request that is generally sent as a broadcast message. A DHCP relay agent 110 receives the discover message request and appends "Option 82" information. "Option 82" information includes circuit identification (ID) and remote ID. Such information allows DHCP server 115 to determine where in a network topology the request is coming from and assign an IP address based on the information technology (IT) enterprise policies.

DHCP server 115 reserves an appropriate DHCP address for DHCP client 105 and issues an offer packet. DHCP relay agent 110 strips out any "Option 82" information and forwards the modified offer packet to DHCP client 105.

DHCP client 105 issues a request packet, which will be received by DHCP relay agent 110. DHCP relay agent 110 appends "Option 82" information, and forwards the appended packet to DHCP server 115. DHCP server 115 transmits an acknowledged packet to DHCP relay agent 110, and DHCP relay agent 110 removes "Option 82" information from the acknowledgement packet. The acknowledgement packet is then transmitted to DHCP client 105, and the address is now bound to DHCP client 105.

An Ethernet layer for an IP network includes a MAC address, which is 48-bits of information (i.e., 6 bytes). By convention, the first 3 bytes are categorized as a manufacturer ID or a vendor ID. Each maker of Ethernet network-enabled equipment includes its own identifier or set of identifiers, which are normally not leveraged for application purposes.

Embodiments of the present invention may provide video configuration data as part of the regular handshake to quickly discern allowed devices that can connect to the display device or network-enabled display device. For example, in FIG. 2, a streaming media device 220 may be connected directly to network-enabled display device 205. This configuration allows for a point-to-point connection to be established, thus removing the need for a DHCP relay agent. Furthermore, such a configuration allows streaming media device (or DHCP client) 220 and network-enabled display device (or DHCP server) 205 to both view "Option 82" information, e.g., circuit ID and remote ID.

In this embodiment, network-enabled display device 205 may include two network interfaces 210, 215. First network-enabled display device network interface 210 may connect network-enabled display device 205 to a network 240 for external visibility, and second network-enabled display device network interface 215 may connect to a streaming media device 220 for dedicated point-to-point network connection.

Streaming media device 220 may also include at least two network interfaces 225, 230. First streaming media device network interface 225 may allow for a connection to be established between streaming media device 220 and network-enabled display device 205. Second streaming media device network interface 230 may be connected to any device, as would be readily appreciated by a person of ordinary skill in the art.

Such an embodiment enables configuration of second network-enabled display device network interface 215 (for point-to-point connection) with a dedicated DHCP server instance. The dedicated DHCP server instance may allow or reject DHCP address requests based on the policies implemented, the vendor ID of the originating equipment's media access control (MAC) address (located in the first 3 bytes of the packet), or based on a combination with "Option 82" information, which is normally used for network topology planning purposes.

The vendor matching policy may be implemented via DHCP address pools, which can be configured to allow IP address requests from a streaming media device 220 that is connected to second network-enabled display device network interface 215 of network-enabled display device 205. This policy can be implemented by inspecting the MAC address of an incoming packet, using a combination of "Option 82" circuit ID or "Option 82" remote ID, or some combination thereof. The incoming packet may also include manufacturer and/or vendor ID information in the first 3-bytes of the packet. Thus, plugging in non-approved equipment to an Ethernet connector would result in a failed attempt to receive an IP address and prevent information from being granted to the connecting device.

Furthermore, "Option 82" information (for example the remote ID) can be used to provide key configuration data to streaming media device 220. Key configuration data may include, for example, expected video formats that can be displayed on network-enabled display device 205.

Figure 2:
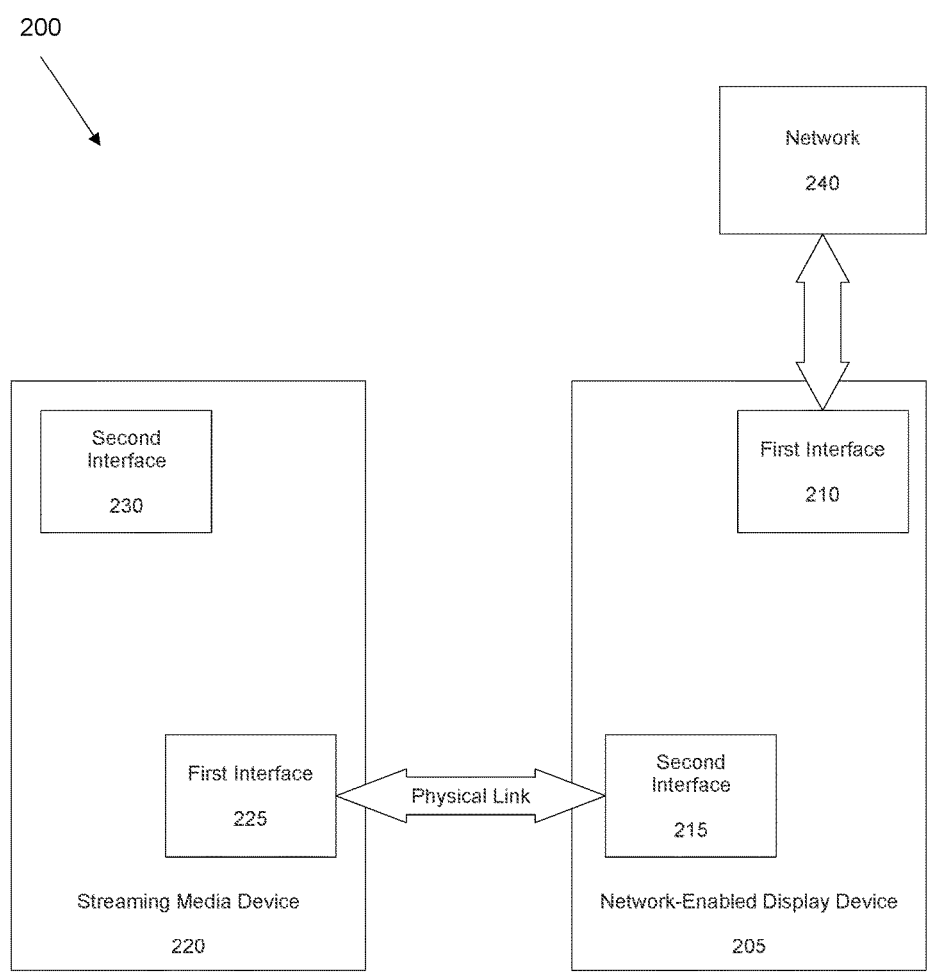
FIG. 2 illustrates a system for connecting a media device and a network-enabled device, according to one embodiment of the present invention.
Figure 3:
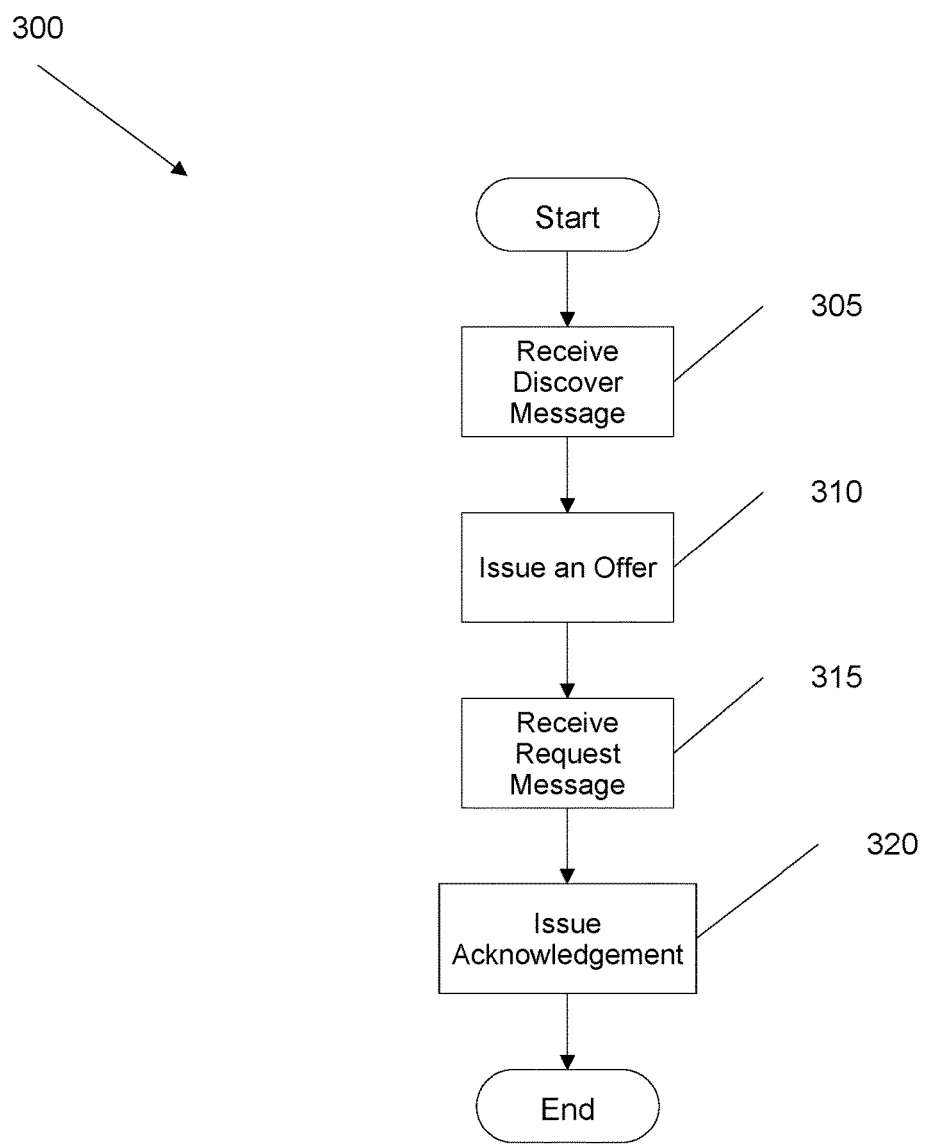
FIG. 3 is a flowchart illustrating a process 300 for connecting a media device and a network-enabled device, according to an embodiment of the present invention.

The embodiments of the present invention allow for network planning policies that are normally used by DHCP for address allocation to also may be used in network-enabled display device 205, as depicted in FIG. 2, to achieve video capability and connection and configuration data exchange. For example, FIG. 3 is a flowchart illustrating a process 300 for connecting a streaming media device to a network-enabled display device. Process 300 may be performed by the components shown in FIG. 2, or the computing system shown in FIG. 4.

At 305, network-enabled device 205 receives a discover message from streaming media device 220. Network-enabled device 205 may reserve an appropriate address for streaming media device 220 and issue an offer that includes "Option 82" information at 310. At 315, network-enabled device 205 receives a request message from streaming media device 220 containing "Option 82" information. At 320, network-enabled device 205 issues an acknowledgement that includes "Option 82" information, and the acknowledgement is received by streaming media device 220.

The method steps shown in FIG. 3 may be performed, in part, by a computer program, encoding instructions for a nonlinear adaptive processor to cause at least the method described in FIG. 3 to be performed by the apparatuses discussed herein. The computer program may be embodied on a non-transitory computer readable medium. The computer readable medium may be, but is not limited to, a hard disk drive, a flash device, a random access memory, a tape, or any other such medium used to store data. The computer program may include encoded instructions for controlling the nonlinear adaptive processor to implement the method described in FIG. 3, which may also be stored on the computer readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC").

Figure 4:
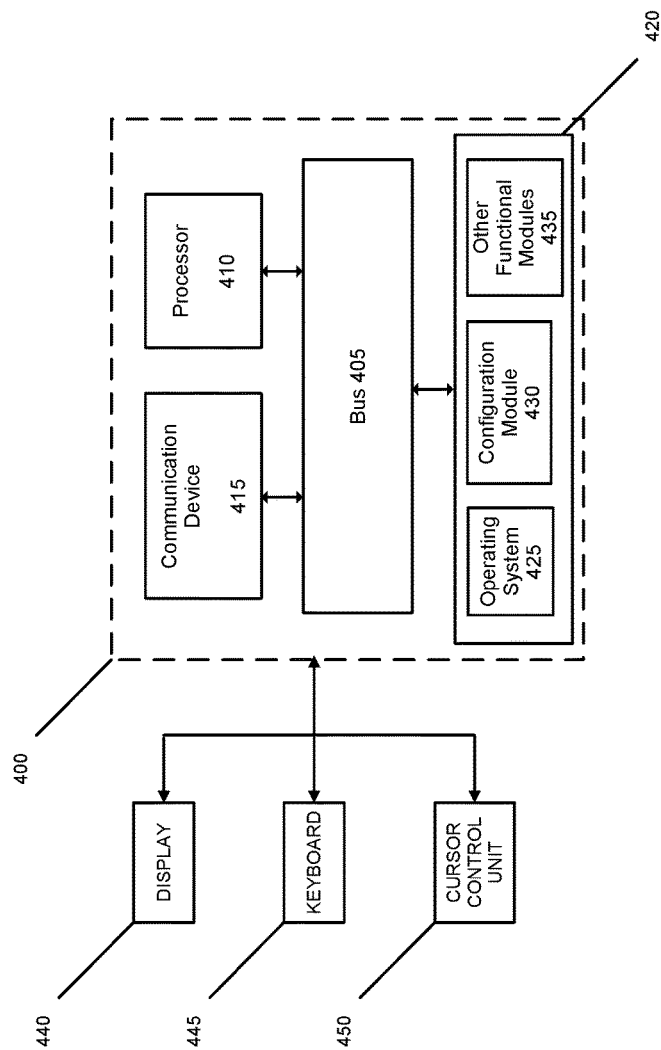
FIG. 4 illustrates a system, according to an embodiment of the present invention.

FIG. 4 illustrates a block diagram of a system 400, according to an embodiment of the present invention. System 400 may include a bus 405 or other communication mechanism that can communicate information and a processor 410, coupled to bus 405, that can process information. Processor 410 can be any type of general or specific purpose processor. System 400 may also include memory 420 that can store information and instructions to be executed by processor 410. Memory 420 can be comprised of any combination of random access memory ("RAM"), read only memory ("ROM"), static storage such as a magnetic or optical disk, or any other type of computer readable medium. System 400 may also include a communication device 415, such as a network interface card, that may provide access to a network.

The computer readable medium may be any available media that can be accessed by processor 410. The computer readable medium may include both volatile and nonvolatile medium, removable and non-removable media, and communication media. The communication media may include computer readable instructions, data structures, program modules, or other data and may include any information delivery media.

Processor 410 can also be coupled via bus 405 to a display 440, such as a Liquid Crystal Display ("LCD"). Display 440 may display information to the user. A keyboard 445 and a cursor control unit 450, such as a computer mouse, may also be coupled to bus 405 to enable the user to interface with system 400.

According to one embodiment, memory 420 may store software modules that may provide functionality when executed by processor 410. The modules can include an operating system 425 and a streaming media configuration module 430, as well as other functional modules 435. Operating system 425 may provide operating system functionality for system 400. Because system 400 may be part of a larger system, system 400 may include one or more additional functional modules 435 to include the additional functionality.

One skilled in the art will appreciate that a "system" could be embodied as a personal computer, a server, a console, a personal digital assistant (PDA), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

One or more embodiments of the present invention pertain to connecting a streaming media device directly to a network-enabled display device. This allows the system to become a point-to-point connection without requiring a DHCP relay agent in the middle of the streaming media device and the network-enabled display device. This also allows the streaming media device and the network-enabled display device to both have visibility into "Option 82" information (client ID and remote ID).

It will be readily understood that the components of the invention, as generally described and illustrated in the figures herein, may be arranged and designed in a wide variety of different configurations. Thus, the detailed description of the embodiments is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with an embodiment may be included in at least one embodiment of the invention. Thus, appearances of the phrases "in certain embodiments," "in some embodiments," "in other embodiments," or other similar language, throughout this specification do not necessarily all refer to the same embodiment or group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A system, comprising:
a network-enabled device;
a streaming media device communicatively connected to the network-enabled device, wherein the streaming media device is configured to generate and send a request including a vendor identifier, a circuit identifier, and a remote identifier, to the network-enabled device; and
a hardware processor coupled to the network-enabled device and configured to:
identify the request as including the vendor identifier, the circuit identifier and the remote identifier; and
allow the request and transmit an acknowledgment that includes the circuit identifier and the remote identifier to the streaming media device.

2. The system of claim 1, wherein the network-enabled device and the streaming media device are linked to establish a point-to-point connection.

3. The system of claim 1, wherein the request includes Option 82 information.

4. The system of claim 3, wherein the Option 82 information includes the circuit identifier and the remote identifier.

5. The system of claim 1, wherein the request is allowed based on a vendor matching policy and the system further includes a physical memory storing the vendor matching policy.

6. The system of claim 5, wherein the vendor matching policy comprises approved circuit identification and remote identification.

7. The system of claim 1, wherein the processor is further configured to execute a vendor matching policy to determine whether to allow the request from the streaming media device.

8. The system of claim 7, wherein the processor is further configured to inspect a media access control layer of the request from the streaming media device to determine whether to allow the request from the streaming media device.

9. A method, comprising:
receiving a request generated by and transmitted from a streaming media device communicatively connected to a network-enabled device, the request generated by the streaming media device including a vendor identifier, a circuit identifier, and a remote identifier;
identifying, by a hardware processor communicatively connected to the network enabled device, the request as including the vendor identifier, the circuit identifier and the remote identifier; and
allowing the request and transmitting, by the hardware processor, an acknowledgment that includes the circuit identifier and the remote identifier to the streaming media device.

10. The method of claim 9, wherein the network-enabled device and the streaming media device are linked to establish a point-to-point connection.

11. The method of claim 9, wherein the request includes Option 82 information.

12. The method of claim 11, wherein the Option 82 information includes the circuit identifier and the remote identifier.

13. The method of claim 9, wherein the request is allowed based on a vendor matching policy that includes approved circuit identification and remote identification.

14. The method of claim 13, further comprising inspecting, by the hardware processor, a media access control layer of the request from the streaming media device to determine whether to allow the request from the streaming media device.

15. A computer program embodied on a non-transitory computer-readable medium, the computer program configured to cause a processor to:
receive a request generated by and transmitted from a streaming media device, the request generated by the streaming media device including a vendor identifier, a circuit identifier, and a remote identifier;
identify the request as including the vendor identifier, the circuit identifier and the remote identifier; and
allow the request and transmit an acknowledgment that includes the circuit identifier and the remote identifier to the streaming media device.

16. The computer program of claim 15, wherein the network-enabled device and the streaming media device are linked to establish a point-to-point connection.

17. The computer program of claim 15, wherein the request includes Option 82 information.

18. The computer program of claim 17, wherein the Option 82 information includes the circuit identifier and the remote identifier.

19. The computer program of claim 15, wherein the request is allowed based on a vendor matching policy that includes approved circuit identification and remote identification.

20. The computer program of claim 15, wherein the computer program is further configured to cause the processor to inspect a media access control layer of the request from the streaming media device to determine whether to allow the request from the streaming media device.

* * * * *